3,059,992
PREPARATION OF THIOPHOSPHORYL CHLORIDE

Rudolf G. Brautigam, New Brunswick, and Bernard Buchner, Westfield, N.J., assignors to The American Agricultural Chemical Company, New York, N.Y., a corporation of Delaware
No Drawing. Filed Aug. 13, 1959, Ser. No. 833,382
13 Claims. (Cl. 23—14)

This invention relates to a method for preparing thiophosphoryl chloride.

Thiophosphoryl chloride, $PSCl_3$, alternatively known as phosphorus (V) sulfochloride, is a chemical which is widely used in industrial processes, particularly as a chemical intermediate in the manufacture of insecticides and the like.

The preparation of thiophosphoryl chloride has previously been accomplished by many different methods including the use of phosphorus trichloride and sulfur monochloride as chlorinating agents. For example, phosphorus trichloride has been reacted with a mixture of sulfur monochloride and phosphorus pentasulfide, with hydrogen sulfide, and with elemental sulfur. However, the reactions are generally slow and usually require the use of pressure. It has been proposed to use catalysts such as aluminum chloride, aluminum, ferric chloride, iron or iodine to render the preparations practicable. The presence of catalysts of this type, however, while facilitating the reactions is not desirable for the reason that the catalysts contaminate the final product.

Another suggested method for the preparation of thiophosphoryl chloride is by reacting carbon tetrachloride with phosphorus pentasulfide in a sealed tube at 180–200° C. This method results in the formation of the highly inflammable carbon bisulfide as a by-product and the use of superatmospheric pressure is in itself objectionable.

The reaction of phosphorus trichloride with sulfur using activated carbon as a catalyst has been proposed, but this reaction requires that the carbon be activated under reducing conditions by means of potassium sulfide and that the reaction mixture be heated under reflux for extended periods of time.

It is an object of this invention to provide an improved process for the preparation of thiophosphoryl chloride.

Another object of this invention is to provide a process which is capable of producing thiophosphoryl chloride uncontaminated by any other materials.

A further object of this invention is to provide a process for producing thiophosphoryl chloride in high yields from readily available starting materials.

Other objects and advantages of this invention will become apparent in the course of the following detailed disclosure and description.

It has now been found that thiophosphoryl chloride can be prepared by the reaction of elemental chlorine with a mixture containing phosphorus and sulfur, hereafter designated a phosphorus-sulfur mixture. This mixture may consist of elemental phosphorus and elemental sulfur or a binary compound of phosphorus and sulfur such as phosphorus sesquisulfide, phosphorus pentasulfide, phosphorus heptasulfide or other binary phosphorus-sulfur compounds with or without the addition of elemental phosphorus or elemental sulfur.

The mixture of reactants is determined in such a way that the molar ratio of phosphorus to sulfur is from about 1:1 to about 1:1.25. In cases where a binary phosphorus-sulfur compound is used the desired ratio is achieved by adding in the elemental form whichever of the elements is deficient in the binary compound or alternatively in utilizing a mixture of binary phosphorus-sulfur compounds such as phosphorus sesquisulfide and phosphorus pentasulfide in a proportion to give the desired molar ratio of phosphorus to sulfur.

For example it has been found that excellent yields of thiophosphoryl chloride may be obtained not only by chlorination of a mixture of elemental phosphorus and elemental sulfur in accordance with the equation:

$$2P + 2S + 3Cl_2 = 2PSCl_3 \tag{1}$$

but also, as shown in the equations below by the use of mixtures of phosphorus sesquisulfide and sulfur (Equation 2), of phosphorus pentasulfide and phosphorus (Equation 3) and of phosphorus heptasulfide and phosphorus (Equation 4).

$$P_4S_3 + S + 6Cl_2 = 4PSCl_3 \tag{2}$$
$$2P_2S_5 + 6P + 15Cl_2 = 10PSCl_3 \tag{3}$$
$$2P_4S_7 + 6P + 21Cl_2 = 14PSCl_3 \tag{4}$$

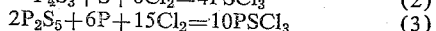
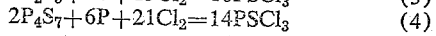

The use of various mixtures of binary phosphorus-sulful compounds will depend upon economic and practical considerations and will be adjusted so that the molar ratio of phosphorus to sulfur falls within the range of from about 1:1 to about 1:1.25 as aforesaid.

The reaction is preferably catalyzed by means of a catalyst such as carbon, silica, diatomaceous earth, the trihalides of metals, for example, aluminum chloride or ferric chloride, and the like. Particularly suitable catalysts are those which will not contaminate the thiophosphoryl chloride product obtained in the reaction, especially carbon catalysts. Charcoal, for example is readily separated from the product by conventional methods such as filtration and distillation and is accordingly utilized in a preferred embodiment of this invention. While the charcoal may be of the activated type this is not necessary for the operation of the process.

In cases where it is desired to conduct the reaction in the absence of a catalyst the use of super-atmospheric pressures and temperatures in the range of from about 130° C. to about 185° C. may be used advantageously.

Since the reaction is conducted in the liquid phase it is essential that a suitable solvent be utilized for the reaction. The preferred solvent is the product of the reaction itself, thiophosphoryl chloride. By using the product itself as solvent it is possible to conduct the reaction with facility. When it is desired to run the process continuously, for example, the use of thiophosphoryl chloride as a solvent renders such continuous operation more feasible since the problem of separation of product from solvent is non-existent.

Although for the above reasons the use of thiophosphoryl chloride as the solvent for the reaction is preferred it is nevertheless possible to utilize other solvents which are inert under the reaction conditions of the process of the instant invention and which have the appropriate solvent power and boiling range.

For instance, in some cases it may be desirable to use certain high boiling solvents, particularly those which have boiling points above about 200° C. at atmospheric pressure. Exemplary of such solvents are naphthalenes, such as diphenyl naphthalene, halogenated aromatic hydrocarbons, such as the trichlorobenzenes, trichloronaphthalenes, chlorinated methylnaphthalenes and the like, and coal tar cuts boiling above about 200° C. A typical example of a suitable solvent is Aroclor 1242, a chlorinated diphenyl.

The reaction may be conducted for example, by suspending the phosphorus-sulfur mixture and the catalyst in thiophosphoryl chloride solvent and then heating to reflux temperature.

Elemental chlorine is then added to the heated mixture in an amount which is preferably from one to two percent less than the stoichiometric amount. When thiophosphoryl chloride is the solvent a temperature of from about 105° C. to about 125° C. is preferably maintained during the addition of chlorine. After the addition of the chlorine the reaction mixture is heated until the reflux temperature is reached, about 125° C. when thiophosphoryl chloride is the solvent, to insure completion of the reaction. The resulting mixture is then filtered and distilled and the fraction boiling at 120° C. to 125° C. is collected. This fraction contains both the thiophosphoryl chloride prepared in the reaction and that used as solvent. In continuous operation usually only a part of the 120°–125° C. fraction is collected as product, part being retained for continuing use as solvent.

In the case of reaction of elemental phosphorus and elemental sulfur with chlorine it has been found desirable to introduce the sulfur into a suspension of molten phosphorus and charcoal in the solvent previous to the addition of chlorine. However, the order of addition of reactants is not in any way critical except for the fact that the chlorine should be added to the mixture of the other reactants.

The following examples, while not intended to be in any way limiting to the scope of this invention, are included for purposes of illustration.

Example 1

Eighty six and five-tenths grams (2.7 moles) of sulfur were added to a suspension of 67.0 grams (2.16 moles) of molten phosphorus and 5 grams of charcoal in 204.3 grams (1.2 moles) of thiophosphoryl chloride. The resulting mixture was heated to reflux and then 225 grams (3.18 moles) of chlorine were introduced at a temperature of 105–125° C. The reaction mixture was then heated until the maximum reflux temperature of 125° C. was attained. This mixture was cooled and filtered and the filtrate was distilled to give a yield of 529.5 grams (3.13 moles). The total yield obtained represented a 100% recovery of the original thiophosphoryl chloride used as solvent and 88.5% of the theoretical yield of the thiophosphoryl chloride newly prepared. N–25/D: 1.559, d–20/4: 1.635.

The following example is included to show the use of a mixture of phosphorus sesquisulfide and sulfur as the phosphorus-sulfur mixture.

Example 2

One hundred and ten grams (0.50 mole) of phosphorus sesquisulfide were suspended with 19.3 grams (0.60 mole) of sulfur and 5.0 grams of charcoal in 200.0 grams (1.18 moles) of thiophosphoryl chloride. The mixture was heated to reflux and 213.0 grams (3.00 moles) of chlorine were introduced at a temperature of 105–125° C. The reaction mixture was then heated to reflux until the maximum temperature of 124° C. was reached. The mixture was then cooled and filtered. The filtrate was distilled to yield 487.9 grams (2.88 moles) of thiophosphoryl chloride. This represented a 100% recovery of the solvent and an 85.0% yield of newly prepared thiophosphoryl chloride. N–25/D: 1.560, d–20/4: 1.6375.

The following example is included to show the use of a mixture of phosphorus pentasulfide and phosphorus as the phosphorus-sulfur mixture.

Example 3

One hundred and seventeen grams (0.525 mole) of phosphorus pentasulfide were added to 44.9 grams (1.45 moles) of molten yellow phosphorus and 5.0 grams of charcoal, all suspended in 200.0 grams (1.17 moles) of thiophosphoryl chloride. The mixture was heated to reflux, after which 266 grams (3.75 moles) of chlorine were added at a temperature of 105–125° C. The resulting mixture was then heated until the maximum reflux temperature of 125°. C. was reached. The mixture was cooled and filtered under suction and the filtrate distilled to yield 588.7 grams (3.47 moles) of thiophosphoryl chloride. This represented 100% recovery of the solvent and a 91.7% yield of newly prepared thiophosphoryl chloride. N–25/D: 1.560, d–20/4: 1.636.

The following example is included to show the use of a mixture of phosphorus heptasulfide and phosphorus as the phosphorus-sulfur mixture.

Example 4

One hundred and twenty-two grams (0.350 mole) of phosphorus heptasulfide were added to 29.0 grams (0.93 mole) of molten yellow phosphorus and 5.0 grams of charcoal suspended in 202.8 grams (1.19 moles) of thiophosphoryl chloride. The mixture was heated to reflux and 248.0 grams (3.49 moles) of chlorine were added at a temperature of 105–125° C. The resulting mixture was then heated until the maximum reflux temperature of 125° C. was reached. The mixture was then cooled and filtered and the filtrate distilled to yield 541.1 grams (3.19 moles) of thiophosphoryl chloride. This represented 100% recovery of solvent and an 85.7% yield of newly prepared thiophosphoryl chloride. N–25/D: 1.559, d–20/4: 1.6358.

The process of the instant invention is thus seen to be capable of producing nearly quantitative yields of thiophosphoryl chloride directly from readily available and easily used starting materials. The product of the process is an exceptionally pure thiophosphoryl chloride uncontaminated with any extraneous materials.

It should be understood that various embodiments of this invention such as the use of phosphorus-sulfur mixtures other than the ones specifically detailed herein is anticipated and included within the scope of the instant invention which is intended to be limited solely by the claims appended hereto.

We claim:

1. A process for the production of thiophosphoryl chloride which comprises reacting elemental chlorine at an elevated temperature up to about 125° C. with a phosphorus-sulfur mixture, said mixture containing in elemental form an element selected from the group consisting of phosphorus and sulfur, in the presence of an inert liquid solvent selected from the group consisting of thiophosphoryl chloride, diphenyl naphthalene, trichlorobenzene, trichloronaphthalene, chlorinated methylnaphthalene and chlorinated diphenyl and recovering thiophosphoryl chloride as product from the reaction admixture.

2. A process in accordance with claim 1 wherein the reaction is carried out in the presence of a catalyst.

3. A process in accordance with claim 1 wherein the reaction is carried out in the presence of carbon as a catalyst.

4. A process in accordance with claim 1 wherein said phosphorus-sulfur mixture consists of elemental phosphorus and elemental sulfur.

5. A process in accordance with claim 1 wherein said phosphorus-sulfur mixture consists of elemental phosphorus, elemental sulfur and a binary compound of phosphorus and sulfur.

6. A process in accordance with claim 1 wherein said phosphorus-sulfur mixture consists of phosphorus pentasulfide and elemental phosphorus.

7. A process for the production of thiophosphoryl chloride which comprises reacting elemental chlorine at an elevated temperature up to about 125° C. with a phosphorus-sulfur mixture, said mixture containing in elemental form an element selected from the group consisting of phosphorus and sulfur, in the presence of liquid thiophosphoryl chloride as a solvent and recovering thiophosphoryl chloride as a product from the resulting reaction admixture.

8. A process in accordance with claim 7 wherein the reaction is carried out in the presence of a catalyst.

9. A process in accordance with claim 7 wherein the reaction is carried out in the presence of carbon as a catalyst.

10. A process in accordance with claim 7 wherein said phosphorus-sulfur mixture consists of phosphorus sesquisulfide and elemental sulfur.

11. A process in accordance with claim 7 wherein said phosphorus-sulfur mixture consists of phosphorus pentasulfide and elemental phosphorus.

12. A process in accordance with claim 7 wherein said phosphorus-sulfur mixture consists of phosphorus heptasulfide and elemental phosphorus.

13. A process in accordance with claim 7 wherein said phosphorus-sulfur mixture contains a binary compound of phosphorus and sulfur.

References Cited in the file of this patent
UNITED STATES PATENTS 2,569,128    Jones _____ Sept. 25, 1951

OTHER REFERENCES

Thorpe: "The Chemical News," vol. 24, 1871, pages 135–136.

Groggins: Unit Processes in Organic Synthesis, 2nd ed., McGraw-Hill Book Co., Inc., N.Y., 1938, page 197.